US012509835B2

(12) United States Patent
Kime et al.

(10) Patent No.: US 12,509,835 B2
(45) Date of Patent: Dec. 30, 2025

(54) BRINE DELIVERY APPARATUS AND METHOD

(71) Applicant: H.Y.O., Inc., Columbus, OH (US)

(72) Inventors: Jack L. Kime, Columbus, OH (US); James A. Kime, Mt. Sterling, OH (US)

(73) Assignee: H.Y.O., Inc., Columbus, OH (US)

( * ) Notice: Subject to any disclaimer, the term of this patent is extended or adjusted under 35 U.S.C. 154(b) by 681 days.

(21) Appl. No.: 17/820,680

(22) Filed: Aug. 18, 2022

(65) Prior Publication Data

US 2024/0060260 A1 Feb. 22, 2024

(51) Int. Cl.
*E01H 10/00* (2006.01)
*G01F 9/02* (2006.01)

(52) U.S. Cl.
CPC .......... *E01H 10/007* (2013.01); *G01F 9/023* (2013.01)

(58) Field of Classification Search
CPC .............................. E01H 10/007; G01F 9/023
See application file for complete search history.

(56) References Cited

U.S. PATENT DOCUMENTS

| 3,267,839 | A | 8/1966 | Crane |
| 3,398,662 | A | 8/1968 | Takata et al. |
| 3,539,113 | A | 11/1970 | Tyler |
| 4,437,806 | A | 3/1984 | Olson |
| 4,747,343 | A | 5/1988 | St. Clair |
| 4,763,844 | A | 8/1988 | van der Lely |
| 4,834,878 | A | 5/1989 | Anderson |
| RE33,835 | E | 3/1992 | Kime |
| 5,186,396 | A | 2/1993 | Wise et al. |
| 5,318,226 | A | 6/1994 | Kime |
| 5,669,208 | A | 9/1997 | Tabaroni et al. |
| 5,669,280 | A | 9/1997 | Niiyama et al. |
| 5,669,531 | A | 9/1997 | Hagemeyer |
| 5,988,535 | A | 11/1999 | Kime |
| 6,382,535 | B1 | 5/2002 | Kime |

(Continued)

FOREIGN PATENT DOCUMENTS

WO WO-2014100674 A1 * 6/2014 ............ F03B 13/182

OTHER PUBLICATIONS

Arun S. Mujumdar, edited by John J. Mcketta. United Operations, 1992 Marcel Dekker, Inc., vol. 2, p. 579.

(Continued)

*Primary Examiner* — Charles R Kasenge
(74) *Attorney, Agent, or Firm* — Emerson, Thomson & Bennett, LLC; Roger D. Emerson; Peter R. Detorre

(57) ABSTRACT

A material calculator for a truck to deliver a predetermined quantity of brine per mile driven by the truck for a known route of miles independent of and proportional to truck speed, wherein the truck carries a known number of gallons of brine and a known number of pounds of salt. The material calculator has a processor accepting entry values of route miles to be driven, number of times the route of miles is to be driven, number of gallons of brine carried by the truck, and the number of pounds of salt carried by the truck. The processor has software for calculating dispensing of the brine and salt so that each is exhausted when the route is completed. A hydraulic pump pumps hydraulic fluid to a variable flow positive displacement pump to implement the calculated number of gallons of brine per mile to be dispensed for the known route.

8 Claims, 12 Drawing Sheets

(56) References Cited

U.S. PATENT DOCUMENTS

| | | |
|---|---|---|
| 6,446,879 B1 | 9/2002 | Kime |
| 6,467,199 B1 | 10/2002 | Christy |
| 6,736,153 B1 | 5/2004 | Kime |
| 6,938,829 B2 | 9/2005 | Doherty et al. |
| 7,044,408 B2 | 5/2006 | Schoenfeld |
| 7,108,196 B2 | 9/2006 | Kime |
| 7,137,214 B2 | 11/2006 | Hoerle |
| 7,172,137 B2 | 2/2007 | Neier |
| 7,306,174 B2 | 12/2007 | Pearson |
| 7,400,058 B1 | 7/2008 | Wayne et al. |
| 8,844,846 B2 | 9/2014 | Owenby et al. |
| 8,888,025 B2 | 11/2014 | Sandler |
| 9,315,960 B2 | 4/2016 | Kime |
| 9,562,333 B2 | 2/2017 | Sandler et al. |
| 10,253,230 B1 * | 4/2019 | Barger ............... B01F 35/2205 |
| 10,787,519 B2 | 9/2020 | Geall et al. |
| 2015/0053784 A1 | 2/2015 | Kime |
| 2016/0186397 A1 | 6/2016 | Kime |
| 2024/0060260 A1 | 2/2024 | Kime et al. |

OTHER PUBLICATIONS

Kocher, Michael F., et al., "Auger Design for Uniform Unloading of Granular Material" University of Nebraska (1995) Biological Systems Engineering: Papers and Publications: Paper 149.
System Pengwyn Monitor v2.3, https://www.youtube.com/watch?v=SUT7Z6XCJ9I, published Mar. 30, 2023.

* cited by examiner

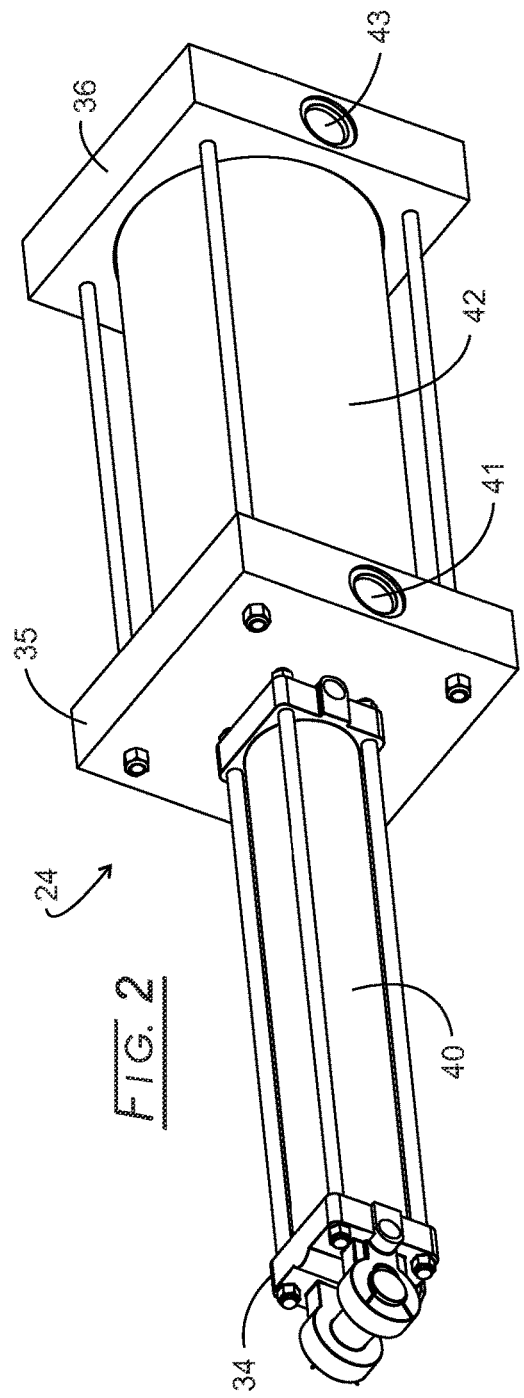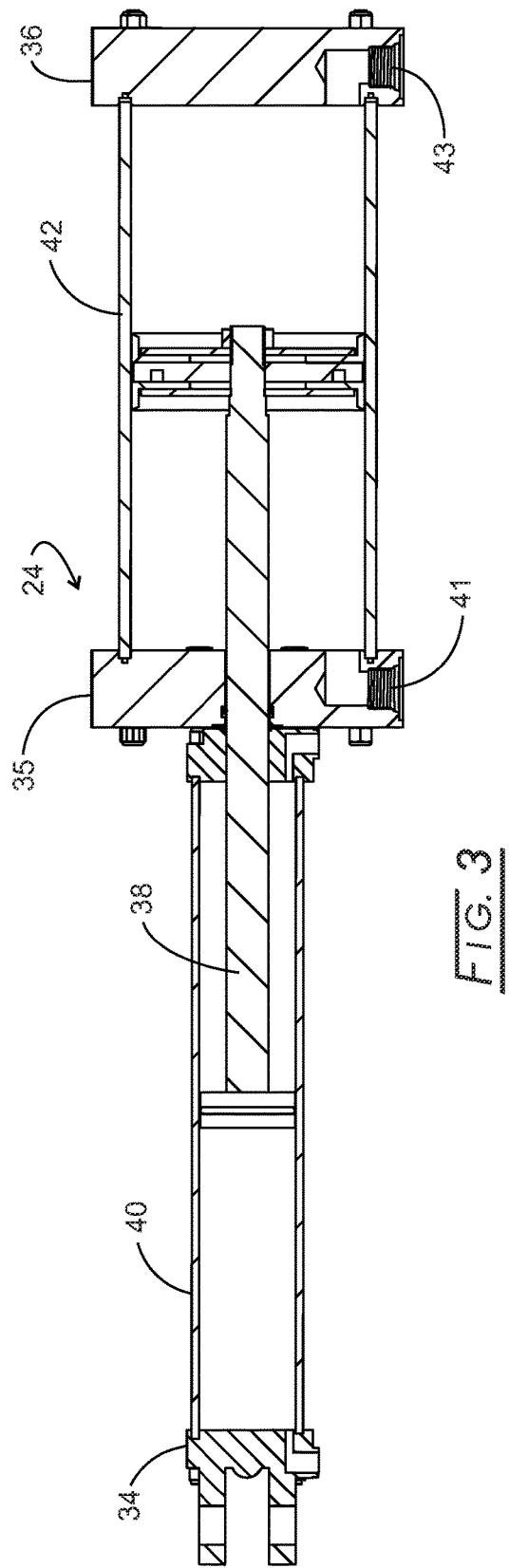

Material Calculator

Route Miles: 20
Repeats: 2
Brine Gallons: 500
Salt Tons: 8

Calculate

Calculated Settings

Wetting: 12.5 Gal/Mile
Granular: 400 lbs/Mile

SAVE
EXIT

FIG. 8A

CONSTANTS MISMATCH

Use MONITOR Values

Use CONTROL BOX Values

Use FACTORY DEFAULTS

| Auger Jam | 2500 | Scraper Period | 1500 | | |
|---|---|---|---|---|---|
| Auger Min | 1 | Scraper Pulse | 200 | Vibe Pulse | 500 |
| Auger Constant | 60 | Dual Cylinder | 3 | Manifold | LS |
| Auger Drag | 50 | Speedo Type | SQUARE | Auger Slip | 50 |
| Wet Slip | 1 | Blast Extend | 500 | | |
| Speed Cal | 3000 | Manual Enable | ON | Adjust Auger Rates | |
| High Temp | 150 | Blast Release | 1500 | Save to: | |
| Alarm Temp | 121 | Plow CB Pulse | 700 | SCREEN? | CONTROL BOX? |
| Truck ID | T-0235 | Password | 4321 | EXIT | |
| Beep Enable | 1 | | | | |

*FIG. 11*

| Auger Jam | 2500 | Scraper Period | 1500 | Please enter value from 550 to 9999 | |
|---|---|---|---|---|---|
| Auger Min | 1 | Scraper Pulse | 200 | | |
| Auger Constant | 60 | Dual Cylinder | 3 | 3000 | |
| Auger Drag | 50 | Speedo Type | SQUARE | 1 2 3 | |
| Wet Slip | 1 | Blast Extend | 500 | 4 5 6 | |
| Speed Cal | 3000 | Manual Enable | ON | 7 8 9 | |
| High Temp | 150 | Blast Release | 1500 | 0 . - | |
| Alarm Temp | 121 | Plow CB Pulse | 700 | DEL OK | |
| Truck ID | T-0235 | Password | 4321 | | |
| Beep Enable | 1 | | | EXIT | |

*FIG. 12*

| Conveyor Rate per setting | | | Spreader Alert Pressures | |
|---|---|---|---|---|
| Setting 1= | 50 lbs/Mile | | Setting 1= | PSI |
| Setting 2= | 75 lbs/Mile | | Setting 2= | PSI |
| Setting 3= | 100 lbs/Mile | | Setting 3= | PSI |
| Setting 4= | 125 lbs/Mile | | Setting 4= | PSI |
| Setting 5= | 150 lbs/Mile | | Setting 5= | PSI |
| Setting 6= | 175 lbs/Mile | | Setting 6= | PSI |
| Setting 7= | 200 lbs/Mile | | Setting 7= | PSI |
| Setting 8= | 225 lbs/Mile | Return | Setting 8= | PSI |
| Setting 9= | 250 lbs/Mile | | Setting 9= | PSI |
| Setting 10= | 275 lbs/Mile | | Setting 10= | PSI |
| Setting 11= | 300 lbs/Mile | | Setting 11= | PSI |
| Setting 12= | 325 lbs/Mile | | Setting 12= | PSI |
| Setting 13= | 350 lbs/Mile | | Setting 13= | PSI |
| Setting 14= | 375 lbs/Mile | | Setting 14= | PSI |
| Setting 15= | 400 lbs/Mile | | Setting 15= | PSI |

FIG. 13

| Conveyor Rate per setting | | | Spreader Alert Pressures | |
|---|---|---|---|---|
| Setting 1= | 50 lbs/Mile | Please enter a value from 1 to 9990 | Setting 1= | PSI |
| Setting 2= | 75 lbs/Mile | | Setting 2= | PSI |
| Setting 3= | 100 lbs/Mile | | Setting 3= | PSI |
| Setting 4= | 125 lbs/Mile | 150 | Setting 4= | PSI |
| Setting 5= | 150 lbs/Mile | | Setting 5= | PSI |
| Setting 6= | 175 lbs/Mile | 1  2  3 | Setting 6= | PSI |
| Setting 7= | 200 lbs/Mile | 4  5  6 | Setting 7= | PSI |
| Setting 8= | 225 lbs/Mile | 7  8  9 | Setting 8= | PSI |
| Setting 9= | 250 lbs/Mile | 0  .  - | Setting 9= | PSI |
| Setting 10= | 275 lbs/Mile | DEL  OK | Setting 10= | PSI |
| Setting 11= | 300 lbs/Mile | | Setting 11= | PSI |
| Setting 12= | 325 lbs/Mile | | Setting 12= | PSI |
| Setting 13= | 350 lbs/Mile | | Setting 13= | PSI |
| Setting 14= | 375 lbs/Mile | | Setting 14= | PSI |
| Setting 15= | 400 lbs/Mile | | Setting 15= | PSI |

FIG. 14

Save Constants to CONTROL BOX?
Are you SURE?

YES
NO

Save Constants to MONITOR?
Are you SURE?

YES
NO

Cycle Power to Complete Calibration!

DISCARD CHANGES?!

NO CHANGES WILL BE APPLIED!!!

YES, EXIT without Saving
NO, Return to Calibration

BRINE DELIVERY APPARATUS AND METHOD

CROSS-REFERENCE TO RELATED APPLICATIONS

None.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to roadway snow and ice control, and more particularly to an apparatus and method for automatically metering the amount of brine delivered to a roadway along with dispensing of salt on the same roadway.

Heretofore, the assignee hereof has disclosed a variety of superior salt and brine delivery systems representing a substantial advancement of this art. Some of those delivery systems can be found in U.S. Pat. Nos. 9,315,960, 7,137, 214, 7,10,796, 6,736,153, 6,446,879, 6,382,535, Re 33,835, 5,318,226, 5,988,535, 7,108,196, 9,315,960, and other patents of the present assignee.

The challenge presented herein is to map out a route for a roadway control vehicle to traverse with a given amount of brine and a given amount of salt particles carried by the vehicle and at the end of the route all of the brine having been dispensed on the roadway. A further part of this challenge is for achieving the brine depletion with caustic and contaminated conditions under which the roadway vehicle operates during the winter when ice and snow control is needed. Brine, obviously, is made by mixing salt and water together, desirably, as close as can be achieved to their eutectic mixture. However, it is well known that the starting salt for making the brine is highly contaminated, reportedly up to 5% rocks, dirt, and other contaminants. With such a highly contaminated brine being dispensed under difficult conditions militates against use of any sensitive electronic controls and feedback loops.

It is to this challenge that the present invention is addressed.

BRIEF SUMMARY OF THE INVENTION

A material calculator for a truck to deliver a predetermined quantity of brine per mile driven by the truck for a known route of miles independent of and proportional to truck speed, wherein the truck carries a known number of gallons of brine and a known number of pounds of salt. The material calculator has a processor accepting entry values of route miles to be driven, number of times the route of miles is to be driven, number of gallons of brine carried by the truck, and the number of pounds of salt carried by the truck. The processor has software for calculating a number of gallons of brine per mile that should be dispensed over the known route and a number of pounds of salt per mile that should be dispensed over the known route, and feeds an electrical signal to a hydraulic pump pumping hydraulic fluid to a variable flow positive displacement pump to implement the calculated number of gallons of brine per mile to be dispensed for the known route.

A method for the delivery of brine housed in an onboard brine tank carried by a vehicle includes actuating a variable flow positive displacement pump assembly (24) that pumps brine from a brine tank (28) and comprising a pair of cylinder assemblies having a single rod assembly reciprocating therebetween, one cylinder assembly in fluid connection with hydraulic fluid and the other cylinder assembly in fluid connection with the brine tank. Brine is withdrawn from the brine tank by passing through an intermediate flow brine manifold assembly (26) in fluid connection with the variable flow positive displacement pump assembly, the brine tank, and an output delivery line.

Brine is delivered from the intermediate flow brine manifold assembly (26) via the output delivery line to a spray nozzle assembly (30) for spraying the brine. A pump control unit (18) is actuated for controlling the variable flow positive displacement pump assembly. The brine delivery method is monitored with a control module (16) that permits a vehicle operator to input data therefor. Both the system monitor and control module are in two-way communication with the pump control unit.

A variable flow positive displacement pump assembly (24) pumps brine from a brine tank (28) and comprises a pair of cylinder assemblies (40, 42) having a single rod assembly (38) reciprocating therebetween, one cylinder assembly in fluid connection with hydraulic fluid (34) and the other cylinder assembly in fluid connection with a flow brine manifold assembly (26) via the output delivery line (52) to a spray nozzle assembly (30) for spraying the brine. Paired with the variable flow positive displacement pump assembly is a flow brine manifold assembly.

The flow brine manifold assembly includes a brine inlet (56) connected to the brine tank, a brine outlet (52), the brine inlet and the brine outlet being in flow communication with a first inlet/outline line (54) connected to the variable flow positive displacement pump assembly and located between the brine inlet and the brine outlet, and being in flow communication with a second inlet/outlet line (58) connected to the variable flow positive displacement pump assembly. A check valve (50) located between the brine inlet and the first inlet/outline line (54). A check valve (48) located between the first inlet/outlet line (54) and the brine outlet. A check valve (44) located between the brine inlet and the second inlet/outlet line (58). Finally, a check valve (46) located between the second inlet/outlet line (58) and the brine outlet.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 2 is an isometric view of the control bi-directional brine pump;

FIG. 3 is a cross-sectional view of the control bi-directional brine pump of FIG. 2;

FIG. 8A is a portably system monitor informational display of the material calculator;

FIG. 11 is calibration display of the system monitor;

FIG. 12 is calibration display of FIG. 11 in the entry mode for changing numerical values;

FIG. 13 is the conveyor (or auger) rate setting display of the system monitor;

FIG. 14 is the numeric value entry mode for the conveyor screen of FIG. 13;

FIG. 15 is the constants save screen of the pump control box;

FIG. 16 is the constants save screen of the system monitor;

FIG. 17 is the cycle power screen of the system monitor for completing the saving and reloading of information for the system monitor;

FIG. 18 is the discard changes screen when no save location has been specified for the system monitor.

The drawings will be described in greater detail below.

DETAILED DESCRIPTION OF THE INVENTION

Figure 1:
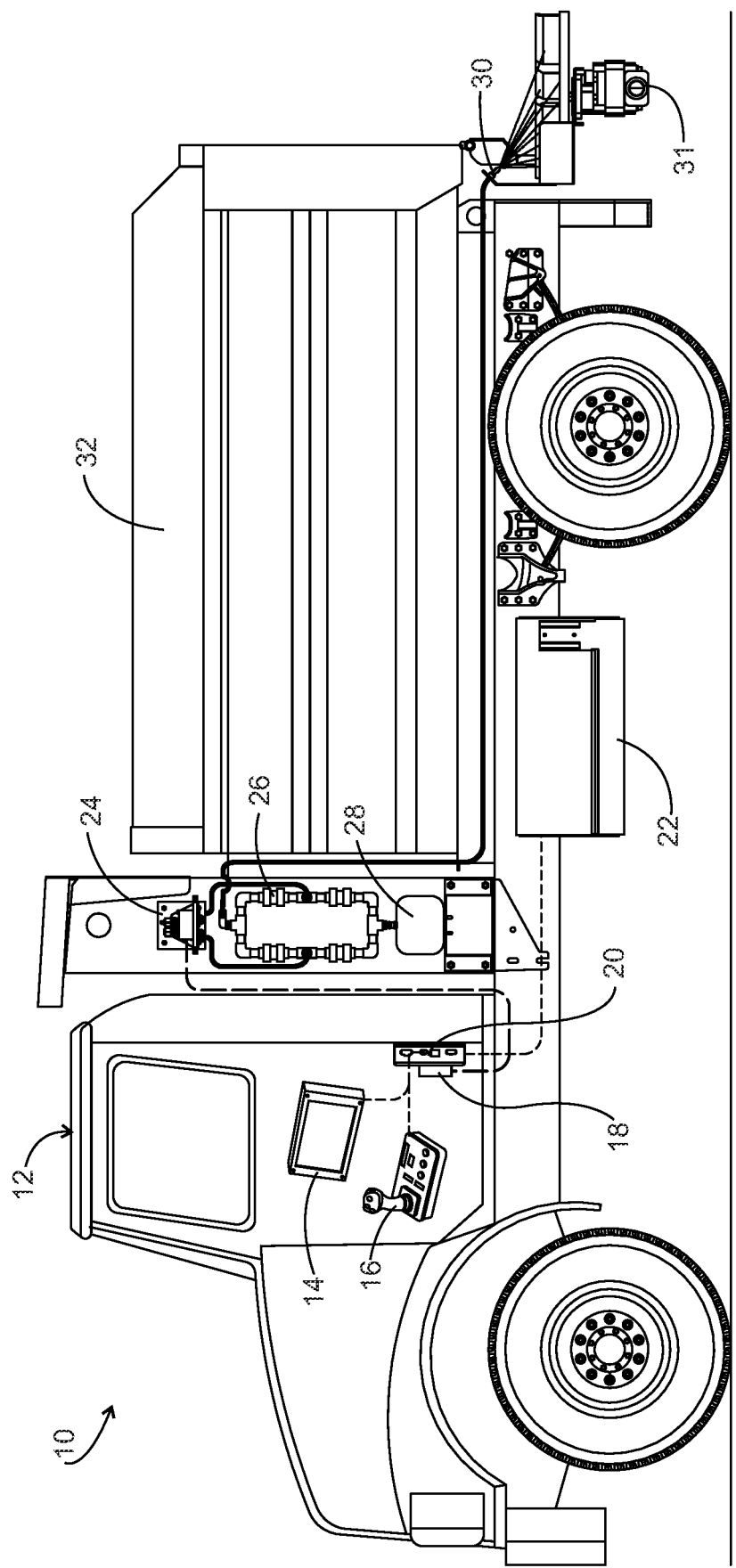
FIG. 1 is an elevational view of the left or driver's side of a salt truck outfitted with the brine delivery apparatus and method disclosed herein.

Referring initially to FIG. 1, a detailed description of a salt/brine delivery truck, 10, reference is made to the description of truck 10 in U.S. Pat. No. 6,382,535. The '535 truck will be the same as present truck 10, except for the brine storage, delivery, and control systems, which will be described in detail below. Although a snowplow is absent in FIG. 1, it can be added to truck 10. The '535 truck describes a 4-bit control system of the salt spreader, while US Publication 2015/0053784 describes a 6-bit salt spreader control system. Either control system can be used for present purposes with equal efficacy. For simplicity, the 4-bit control system will be used herein for illustration purposes only.

Mounted in a cab, 12, of truck, 10, is a portable system monitor, 14, having a visual display for the driver along with memory have a computer program stored therein for operating the generation of brine and spreading of salt carried by salt truck 10.

Also mounted in cab 12 for the driver is a control module, 16, used by the driver for operation of the brine and particulate salt distribution systems. Both system monitor 14 and control module 16 are in two-way communication with a pump control unit, 20, that also is mounted in cab 12 of truck 10 for controlling the brine distribution. In turn, pump control unit 18 is mounted to a FET board (Field Effect Transistor board), 20, that is in communication with a manifold valve assembly, 22, for its control. Pump control unit 18 is in electrical communication a positive flow control brine pump assembly, 24. It should be mentioned in passing that the portability (long electrical cord, for example) and display feature (described later herein) permits the driver to carry it to manifold valve assembly 22 for trouble shooting the hydraulic control valves therein to locate any not operating properly. See the description of FIG. 10 for more on this trouble shooting ability for the truck operator.

Continuing with FIG. 1, positive flow control brine pump assembly 24 is in connection with a positive flow brine manifold assembly, 26, that is connected to a brine tank, 28, and to spray nozzle assembly, 30, located at the rear of truck 10 and which sprays brine from brine tank 28 onto salt being spread by a salt spreading assembly, 31, whose construction and operation can be found described in U.S. Pat. No. 9,315,960, and other patents referenced herein. Of course, granular salt is housed with a truck bed, 32, wherein the housed salt can be dispensed on a roadway surface by salt spreading assembly 31.

Referring to positive flow control brine pump assembly 24 in more detail, reference now is made to FIGS. 2 and 3, wherein a representative such assembly is illustrated. A hydraulic fluid flow assembly, 34, permits flow of hydraulic fluid from and to a hydraulic fluid chamber, 40, of flow brine pump assembly 24 which is located on the "hydraulic" side of the pump. A salt side chamber, 42, is terminated by a pair of ends, 35 and 36 having brine outlets, 41 and 43. Salt side chamber 42 houses one end of a rod assembly, 38, while hydraulic chamber 40 houses the other end of rod assembly 38. Salt side chamber 42 has a brine outlet in end 35 and a brine outlet in end 36. Regardless of which way rod assembly 38 is moving, brine can be pumped from positive flow control brine pump assembly 24.

Figure 4:
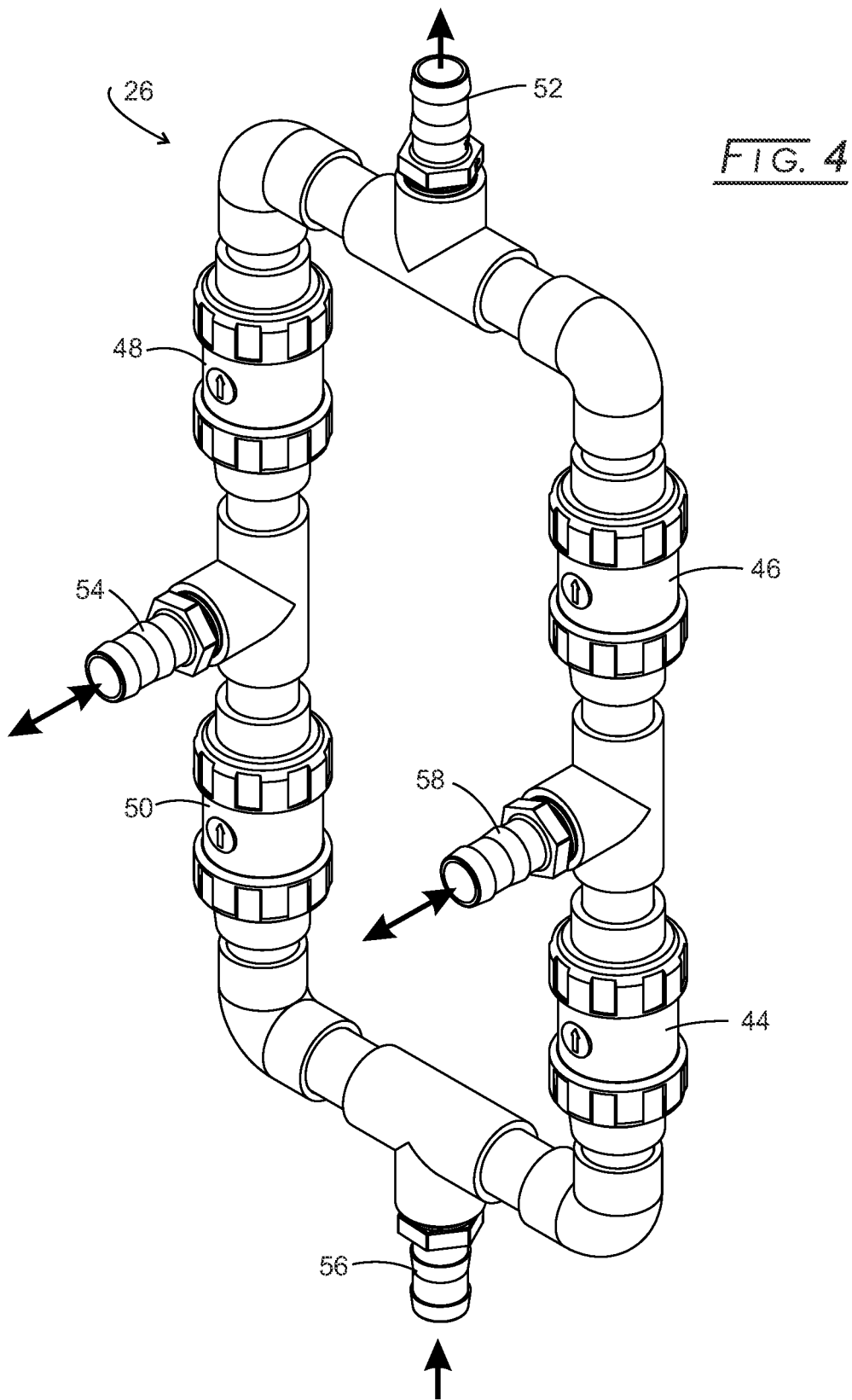
FIG. 4 is an isometric view of the flow brine manifold.

Positive flow brine manifold assembly 26 is seen in FIG. 4 and receives brine being pumped from positive flow control brine pump assembly 24. This assembly has 4 check valve assemblies, 44, 46, 48, and 50, that operate in conventional fashion for permitting brine flow in a single direction. There are 4 inlet/outlet assemblies, 52, 54, 56, and 58, for brine to either enter or exit from this manifold assembly. Again, these inlet/outlets operate in conventional fashion as permitting inlet and/or outlet of brine flow. Positive flow brine manifold assembly 26 operates to transfer brine received from/to positive flow control brine pump assembly 24 and spray nozzle assembly 30. Inlet assembly 56 receives brine from brine tank 28 while outlet assembly 52 distributes brine to spray nozzle assembly 30. Each of inlet assembly 56 outlet assembly 52 operate in a single direction. Each of inlet/outlet assemblies 54 and 58 operate in both directions and are in brine flow connection to brine flow assembly 35 and 36 of positive flow brine pump assembly 24.

Figure 5:
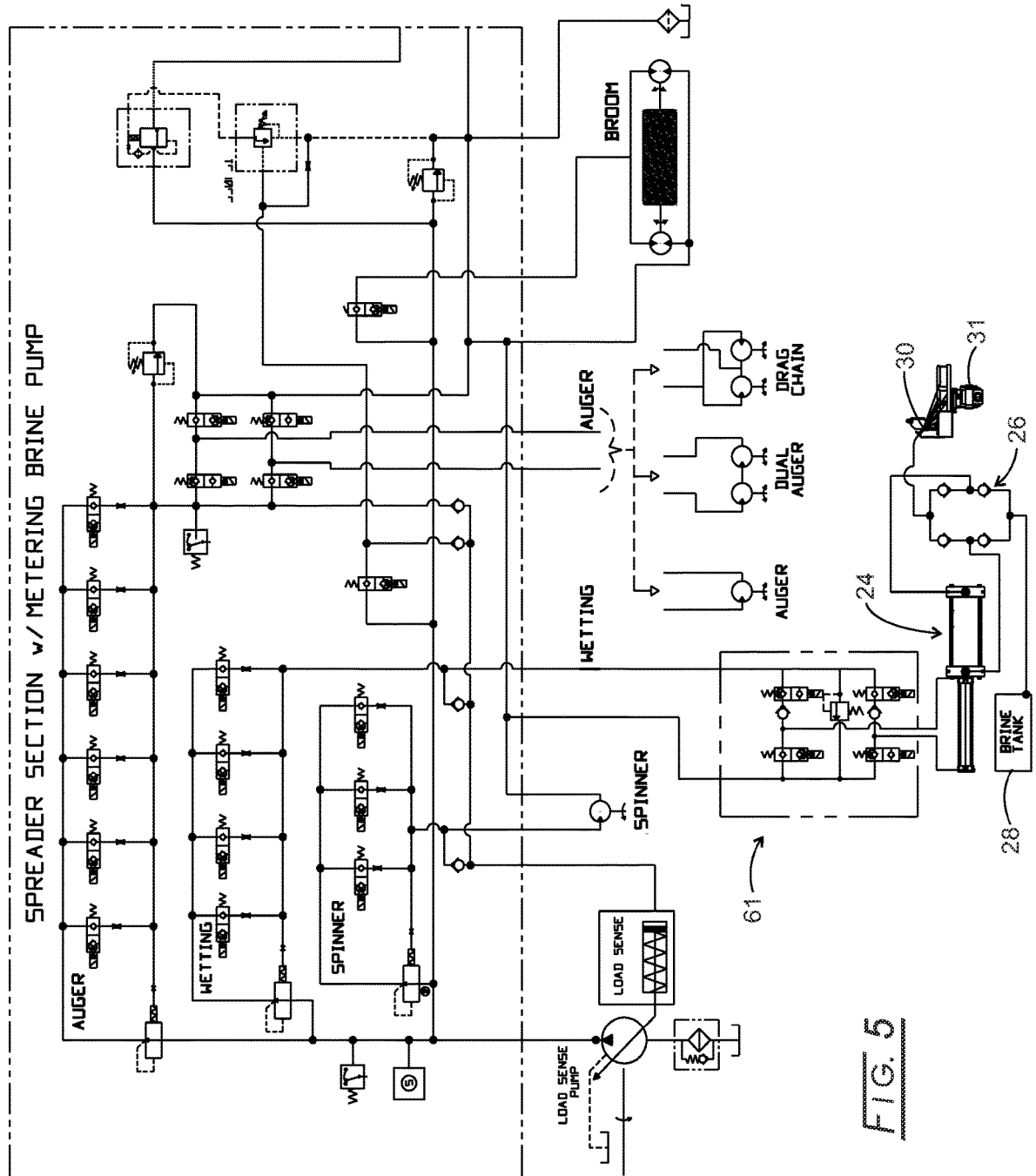
FIG. 5 is a schematic hydraulic diagram showing the components employed in the 4-bit hydraulic manifold for the salt spreader and brine spray for the truck of FIG. 1.

A schematic hydraulic diagram, 60, in FIG. 5 shows the components employed in the 4-bit hydraulic manifold illustrated herein and its detailed description can be found in U.S. Pat. Nos. 7,108,106 and 9,315,960 for a 4-bit system as illustrated herein and a 6-bit system as found in U.S. Publications Nos. 2015/0053784 and 2016/0186397. Different from the hydraulic systems in those prior systems is a material calculator described later herein that calculates the dispensing rate of brine and salt so that the truck returns at the end of the route with all of the brine being used and a calculated rate of salt having been dispensed. Each of the illustrated components operate in conventional fashion.

Figure 6:
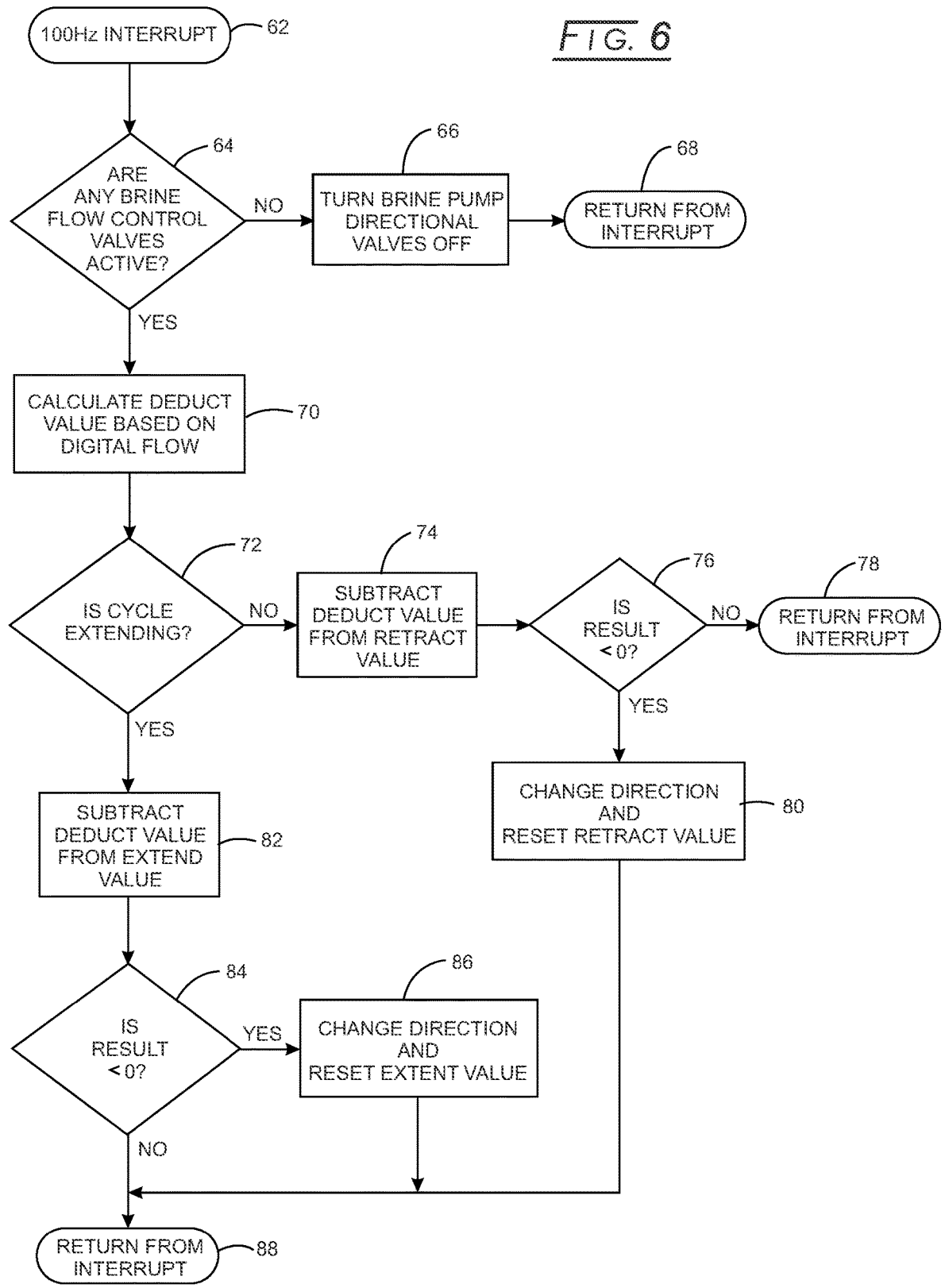
FIG. 6 is a block diagram illustrating the operation of the software for the brine delivery system.

Referring now to FIG. 6, is the block diagram illustrating the operation of the software for the brine delivery system. The software starts as block 62 wherein the logic proceeds to block 64 where the determination is made as to whether any of the brine flow control valves are active. If not, the logic proceeds to block 66 where the brine pump directional valves are turned off the logic proceeds to block 68 wherein the logic returns to start block 62.

If any flow control valve is active in block 64, the logic proceeds to block 70 wherein the deduct value is calculated based on the digital flow. From there the logic proceeds to block 72 wherein it is queried whether the cycle is extending. If not, the logic proceeds to block 74 where the deduct value is subtracted from the retract value and on to block 76 where the determination is made whether the value in block 76 is less than 0. If not, the logic proceeds to block 78 from where the logic returns to start block 62. If the value in block 76 is less than 0, the logic proceeds to block 80 where the direction of brine flow is reversed and the extend value is reset. From there, the logic proceeds to block 88 and the logic proceeds to start block 62.

Returning to block 72 wherein the cycle is determined to be extending from whence the logic proceeds to block 82 wherein the deduct value is subtracted from the extend value. From there, the logic proceeds to block 84 where the resulting numerical is queried to be less than 0. If that query is true, the log proceeds to block 86 where the flow direction is reversed, and the retract value reset. If the query in block 84 is not less than zero, the logic proceeds to block 88 and the logic proceeds as described earlier for block 62.

Figure 7:
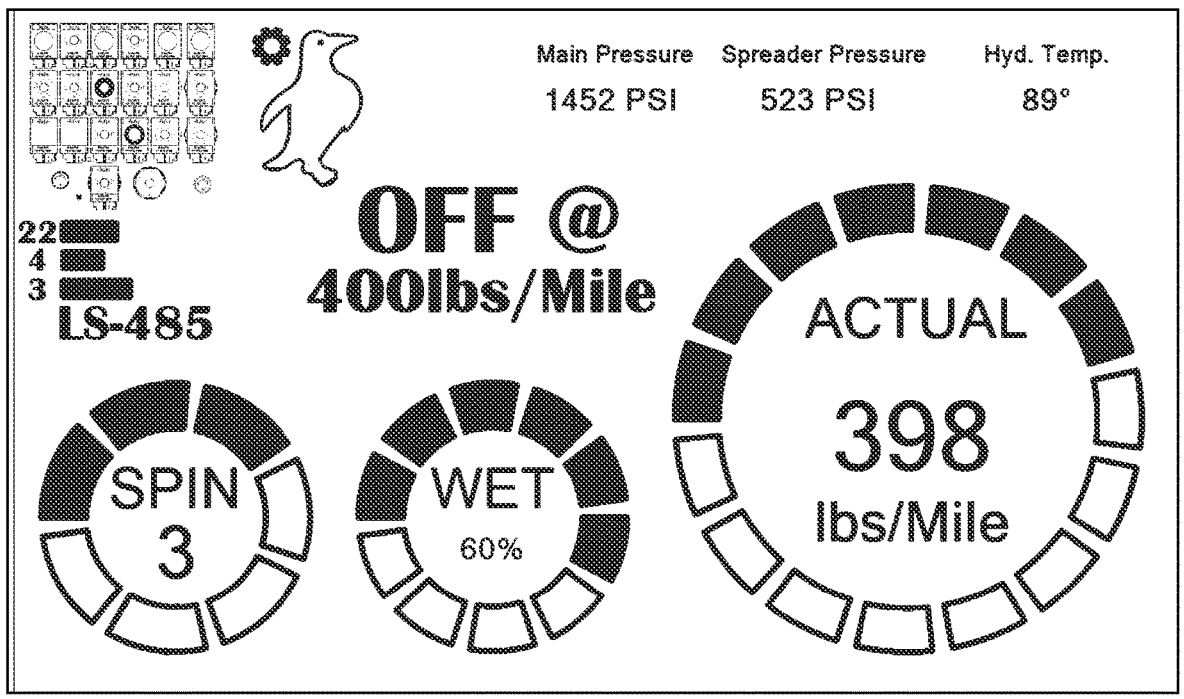
FIG. 7 is the informational display of the system monitor for the truck driver of the salt and brine delivery parameters.

With reference to FIG. 7, illustrated is the driver hydraulics display of system monitor 14 for the truck driver. Values of the main hydraulic pressure, salt spreader pressure, and hydraulic fluid temperature are displayed at the top of the display. The salt spreader spin rate, degree of brine concentration in the salt being spread, and miles driven during the current trip of truck 10 also are displayed. A next display, calculated salt rate displayed per mile driven, as in FIG. 8 is shown by the truck operator pushing the Pengwyn™ logo of the display.

Figure 8:
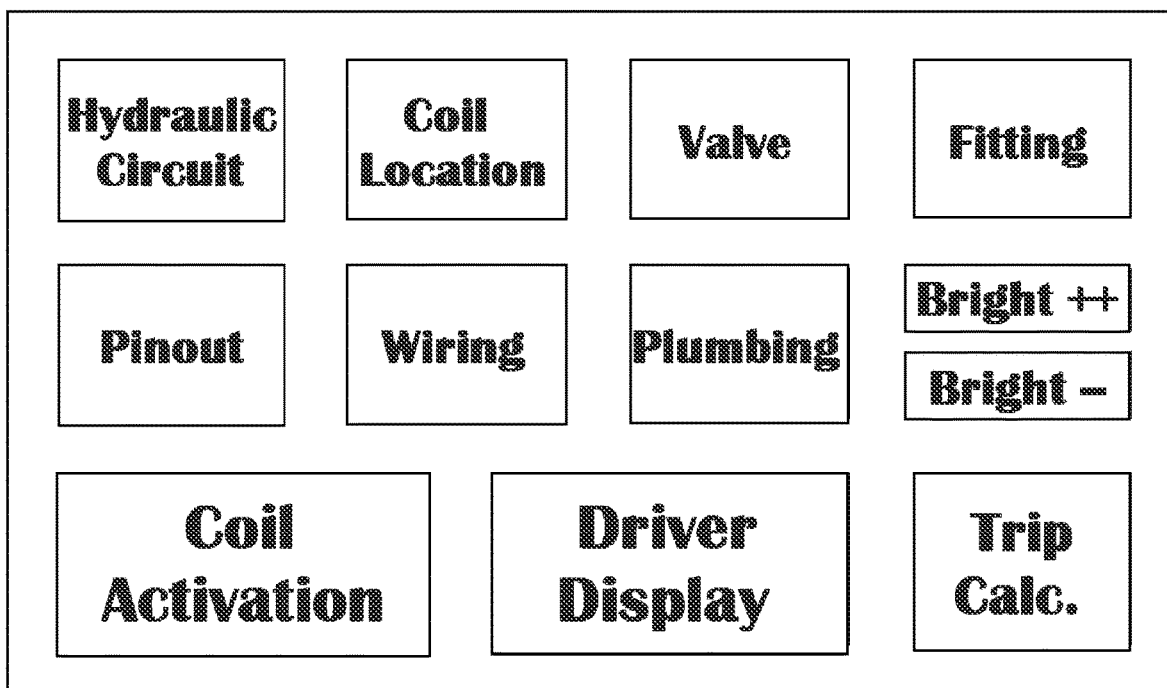
FIG. 8 is the mechanics diagram index display of the system monitor.

FIG. 8 of informational display of system monitor 14 permits the operator to call up the mechanics diagram of the various mechanical operations described herein. Those operations can be read in FIG. 8 and include hydraulic circuit diagram, wiring diagram, coil location and wire color diagram, hydraulic plumbing diagram, valve location and part number diagram, fitting diagram, screen brightness controls, return to driver display, coil activation, trip calculator, and wiring harness pinout.

Depressing the "Trip Calc" display in FIG. 8 causes the display in FIG. 8A to pop up. This Material Calculator screen permits the driver to enter the number of miles of the route to be driven, the number of times the route is to be traversed, the number of gallons of brine on the truck, and the number of tons of salt carried by the truck. Since the truck is to return with an empty brine tank, the processor software will calculate the rate at which brine is to be sprayed (Wetting in number of gallons of brine per mile driven) and the number of pounds of salt to be dispersed (Granular in pounds per mile driven), which are additional displayed numbers displayed on the Material Calculator screen. The driver then can save these calculated Wetting and Granular numbers or exit this screen without saving any of the information entered and calculated. In either event, the screen display returns to the previous display.

Figures 9, 10:
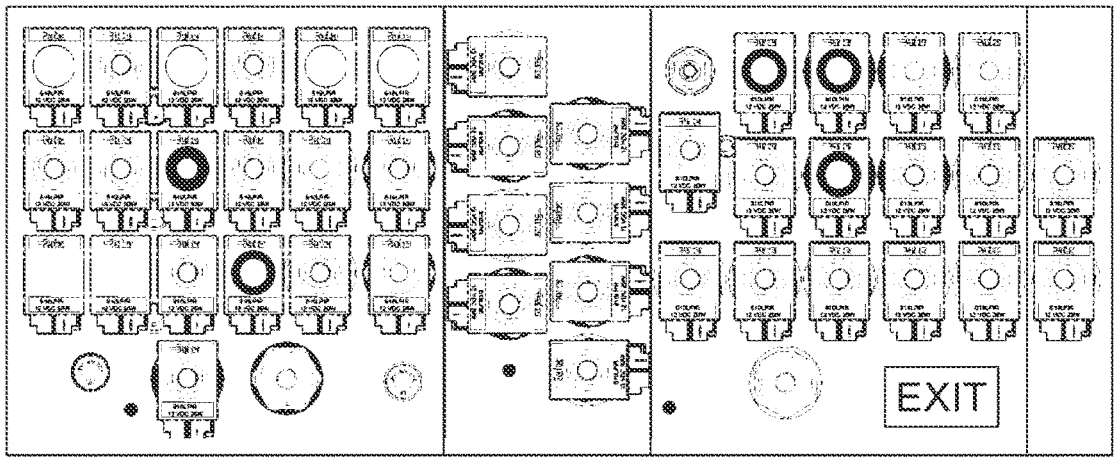
FIG. 9 is the s/calibration mismatch display of the system monitor displayed at startup.
FIG. 10 is the solenoid status display of the system monitor.

At the startup of the system operation, the logic checks to see whether system monitor 14 is attached and that the calibration data stored therein matches the calibration data stored in control module 16. If they match, the logic continues to the main operator display of system monitor 14. If they do not match, the Positive flows Mismatch screen, as seen in FIG. 9, pops up for the operator. The operator, then, can select to use calibration data stored in system monitor 14, the calibration data stored in control module 16, or restore the factory default calibration data. This comparison is made each and every time that the driver starts up truck 10 for operation.

FIG. 10 shows whether the solenoids are in an "on" or an "off" position by the colors green, blue, or red from left to right, respectively. That is, the driver can compare the display of the valves indicated to be in an energized state to the actual valves in manifold valve assembly 22 by simply holding a magnetic susceptible metal item (such as, for example, a screwdriver) next to each "activated" valve. Those valves that are "activated" will be magnetic and attract the screwdriver. If those "on" indicated valves fail to attract the screwdriver, then the operator can check the electrical lines to that valve and the valve itself to repair the trouble and/or to replace the line and/or valve responsible for the non-operation of the trouble valve. The box "Coil Activation" in FIG. 8 causes the screen in FIG. 10 to appear for this trouble shooting operation.

FIG. 11 is the calibration display for control module 16 and is accessed by the truck operator pressing a "blast" labeled button and entering a passcode, whereupon the calibration screen is displayed. The left column displays the calibration settings. The adjustable values then are displayed in the next column. Variable information is displayed in the upper right-hand box. The salt spreading adjustment and spreader alert pressures are seen in the box labelled "Adjust Auger Rates". Below these values are the save options to control module 16 and monitor 14. The "Exit" option is displayed therebeneath.

FIG. 12 shows the popup keypad for entering desired values for the calibration display in FIG. 11. In particular the "Speed Cal" value change is being changed by entering a new value in FIG. 11 for illustration purposes only. The upper variable information box will display the value entered by the popup keypad. Again, any of the calibration values can be activated and changed by the popup keypad.

The conveyor (auger) rate settings are displayed in FIG. 13 for control module 16. If changes are required, the operator can select the popup keypad as shown in FIG. 14. The driver need only select a given conveyor rate setting and enter a new value in the keypad. Once the driver is satisfied with the displayed and/or new values entered, the driver presses the "ok" button on the keypad and then the "Return" button to return to the calibration screen of FIG. 11.

There are 2 possible save locations: control module 16 and in system monitor 14. Saving the new values to both locations will eliminate the Positive flowsMismatch screen of FIG. 9 from appearing. FIG. 15 permits the driver to save the new values to control module 16 while FIG. 16 permits the driver to save the new calibration values to system monitor 14. Since power must be cycled to complete saving and loading of the calibration values (s), the screen of FIG. 17 appears to permit the power to be cycled and ensure that the new calibration positive flowsare retained in the desired locations selected by the driver (operator). Should the operator determine that the new values set not be saved, the operator can accomplish this through the screen shown in FIG. 18.

Figure 19:
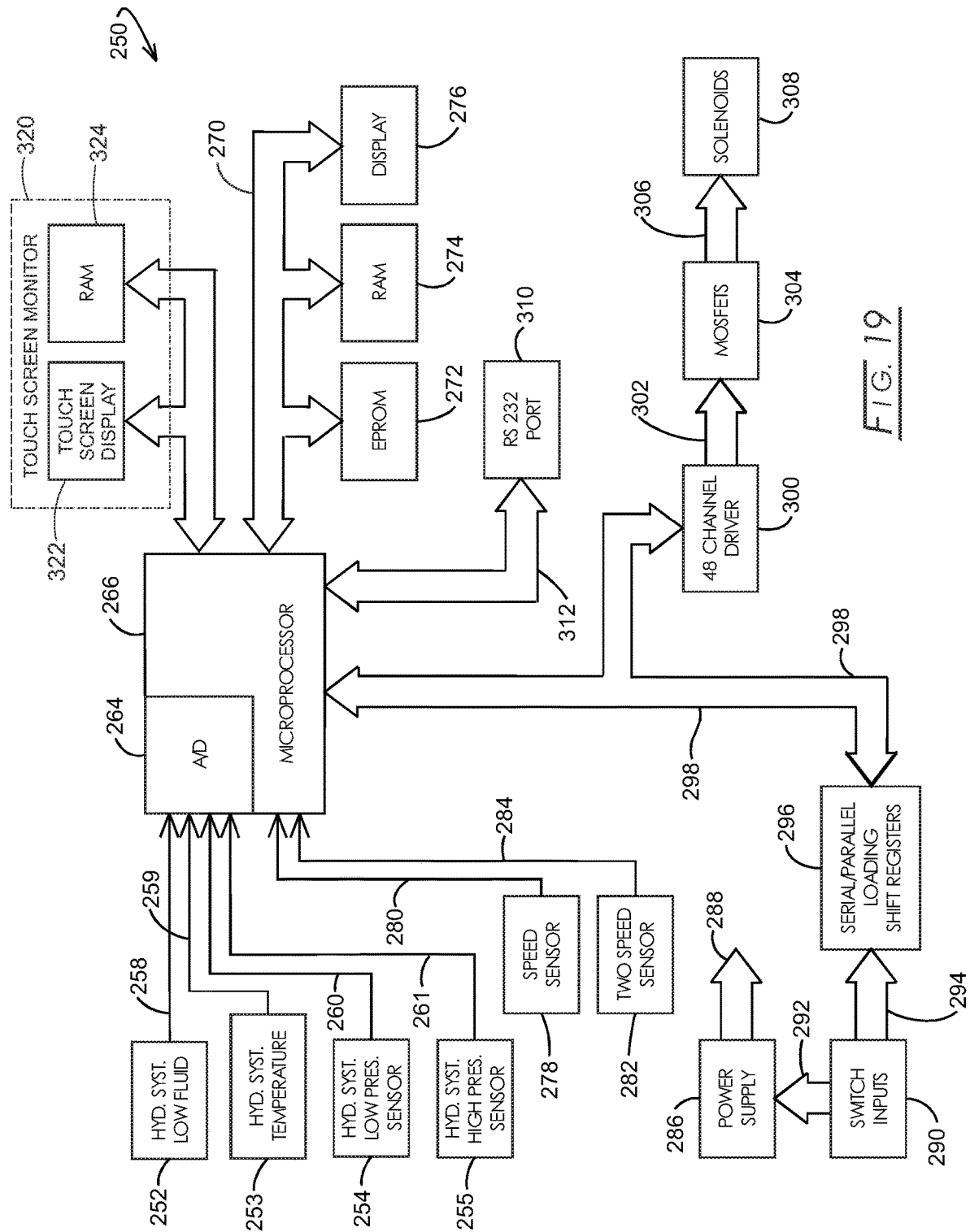
FIG. 19 is a block schematic diagram of a control circuit which may be employed with the invention.

Referring to FIG. 19, a block diagrammatic representation of a microprocessor driven control function for vehicle 10 and its associated snow-ice control features is identified generally at 253. See also U.S. Pat. No. 7,108,196 in this regard. Block 320 represents monitor 14 and its memory, RAM 324, and its touch screen display, 322. The values of brine and salt to be dispensed (see FIG. 8A) and other values stored in monitor 14 are sent to a microprocessor, 266. The control function operates in conjunction with six sensor functions. In this regard, a hydraulic system low fluid sensor is provided as represented at block 252. A hydraulic system temperature sensor function is provided as represented at block 253. Hydraulic system low-pressure sensor function is provided as represented at block 254, and a hydraulic system high-pressure sensor is provided as represented at block 255. The functions represented at blocks 252-255 provide inputs as represented at respective lines 258-261 to the analog-to-digital function represented at sub-block 264 of a microprocessor represented at block 266. Additional inputs include Microprocessor 266 may be provided as a type PIC18F8723 marketed by Microchip Technology Corporation. Device 266 is a high-density complimentary metal-oxide semiconductor with an eight-bit MCU with on-chip peripheral capabilities. These peripheral functions include a sixteen-channel analog-to-digital (A/D) converter as noted above. Two asynchronous serial communications interfaces are provided, and a separate synchronous serial peripheral interface is included. Its main eight and sixteen-bit, free-running timer system has five input capture lines, five-compare lines, and a realtime interrupt function. An eight-bit pulse accumulator sub-system can count external events or measure external periods. Device 266 performs in conjunction with memory (EPROM) as represented at bi-directional bus 270 and block 272. Communication also is seen to be provided via bus 270 with random access memory (RAM) as represented at 274. The LCD display 204 is represented at block 276. This function may be provided by a type NHD-116DZ-FL-GBW assembly which consists of an LCD display, a CMOS driver and a CMOS LSI controller marketed by Newhaven display of Elgin, IL. Digital sensor inputs to the microprocessor function 266 are provided from a speed sensor represented at block 278 and line 280. In general, the speed sensor will output 40,000 pulses per mile of vehicle travel which equates to 7.S pulses per foot. A two-speed sensor digital input is supplied to micro-processor 266 as represented at block 282 and line 284.

The circuit power supply is represented at block 286. This power supply, providing two levels of power, distributes such levels where required as represented at arrow 288. Supply 286 is activated from the switch inputs as discussed in connection with FIG. 7 and represented in the instant figure at block 290 and arrow 292. These various console and auxiliary console or control box switch inputs as represented at block 290 also are directed, as represented at arrow 294 to Microprocessor 266. As represented by bus 298, communication with the function at block 296 is provided with the microprocessor function represented at block 266. Bus 298 directed to a thirty-two channel driver function represented at block 300. Function 300 may be implemented with a thirty-two channel serial-to-parallel converter with high voltage push-pull outputs marketed as a type HV9308 by Supertex, Inc. The output of the driver function represented at block 300 is directed, as represented by arrow 302, to an array of metal-oxide semiconductor field effect transistors (MOSFETS) as represented at block 304. These devices may be provided as auto-protected MOSFETS type VNPION07FI marketed by SGS-Thomson Microelectronics, Inc. The outputs from the MOSFET array represented at block 304 are directed as represented by arrow 306 to solenoid actuators as represented at block 308. Two RS232 ports are provided within the control function 250 as represented at block 310 and arrow 312 communicating with microprocessor function 266.

While the apparatus, system, and method have been described with reference to various embodiments, those skilled in the art will understand that various changes may be made, and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the Imperial Unit System (pounds, gallons, yards, etc.) and all amounts and percentages are by weight, unless otherwise expressly indicated. Also, all citations referred herein are expressly incorporated herein by reference.

The invention claimed is:

1. A material calculator for a truck to deliver a predetermined quantity of brine per mile driven by the truck for a known route of miles independent of and proportional to truck speed, wherein the truck carries a known number of gallons of brine and a known number of pounds of salt, wherein:
the material calculator comprising a processor that accepts entry values of route miles to be driven, number of times the route of miles is to be driven, number of gallons of brine carried by the truck, and the number of pounds of salt carried by the truck,
the processor comprising software for calculating a number of gallons of brine per mile that should be dispensed over the known route and a number of pounds of salt per mile that should be dispensed over the known route,
the processor configured to feed an electrical signal to a hydraulic pump pumping hydraulic fluid to a positive flow control brine pump to implement the calculated number of gallons of brine per mile to be dispensed for the known route.

2. The material calculator of claim 1, wherein the processor feeds an electrical signal to an auger for dispensing the calculated number of pounds per mile of salt to be dispensed for the known route.

3. The material calculator of claim 2, wherein a selectable option is stored in a system monitor (14), wherein the system monitor controls the generation of brine dispensing and salt dispensing.

4. The material calculator of claim 3, wherein the system monitor has a visual display.

5. The material calculator of claim 3, wherein the material calculator controls the amount of brine delivered by the truck and calculates a predetermined quantity of brine to be delivered per mile driven by the truck for a known route of miles independent of and proportional to truck speed, wherein the truck carries a known number of gallons of brine and a known number of pounds of salt, wherein the material calculator comprises:
a processor accepting entry values of route miles to be driven, number of times the route of miles is to be driven, number of gallons of brine carried by the truck, and the number of pounds of salt carried by the truck, wherein the processor comprises software for calculating a number of gallons of brine per mile that should be dispensed over the known route and a number of pounds of salt per mile that should be dispensed over the known route, and wherein the processor feeds an electrical signal to a hydraulic pump pumping hydraulic fluid to a variable flow positive displacement pump assembly to implement the calculated number of gallons of brine per mile to be dispensed for the known route.

6. The material calculator of claim 1, wherein a control module (16) is in communication with the material calculator and a pump control unit (20) which pump control unit is in communication with a field effect transistor board (FET, 20) which FET is in communication with a manifold valve assembly (22) which manifold valve assembly is fed brine by the variable flow positive displacement pump.

7. A method for the positive flow delivery of brine housed in an onboard brine tank carried by a vehicle comprising the steps of:
(a) actuating a variable flow positive displacement pump assembly (24) that pumps brine from a brine tank (28) and comprising a pair of cylinder assemblies (40, 42) having a single rod assembly (38) reciprocating therebetween, one cylinder assembly in fluid connection with hydraulic fluid (34) and the other cylinder assembly in fluid connection with an intermediate brine manifold assembly (26);
(b) withdrawing brine from the brine tank by passing through the intermediate brine manifold assembly in fluid connection with the variable flow positive displacement pump assembly, the brine tank, and an output delivery line;
(c) delivering brine from the intermediate brine manifold assembly (26) via the output delivery line to a spray nozzle assembly (30) for spraying the brine;
(d) actuating a hydraulic pump control unit (18) for controlling the variable flow positive displacement pump assembly;
(e) monitoring the brine delivery method with a system monitor (14) and a control module (16) that permits a vehicle operator to input data therefor, wherein both the system monitor and the control module are in two-way communication with the pump control unit; and,
(f) employing a material calculator to control the amount of brine to be delivered by a vehicle on a roadway route wherein the amount of brine comprises a predetermined quantity of brine per mile driven by the vehicle for a known route of miles independent of and proportional to vehicle speed, wherein the vehicle carries a known number of gallons of brine and a known number of pounds of salt, wherein the material calculator comprises: a processor accepting entry values of route miles to be driven, number of times the route of miles is to be driven, number of gallons of brine carried by the vehicle, and the number of pounds of salt carried by the vehicle, wherein the processor executes software to calculate a number of gallons of brine per mile that should be dispensed over the known route and a number of pounds of salt per mile that should be dispensed over the known route, and wherein the processor feeds an electrical signal to a hydraulic pump pumping hydraulic fluid to a variable flow positive displacement pump assembly to implement the calculated number of gallons of brine per mile to be dispensed for the known route.

8. A method for dispensing one or more of brine or salt by a truck onto a roadway route for the truck to traverse, comprising the steps of:
(a) entering the following values into a material calculator onboard the truck:
(i) number of miles of the roadway route to be driven by the truck;
(ii) number of times the roadway route will be driven by the truck;
(iii) number of gallons of brine carried by the truck; and
(iv) number of pounds of salt carried by the truck;
(b) the material calculator having software therein for calculating values as follows:
(i) the number of gallons of brine to be dispensed by the truck per mile driven by the truck on the roadway route, and
(ii) the number of pounds to be dispensed by the truck per mile driven by the truck on the roadway route; and
(c) setting controls on the truck for delivery of brine and salt corresponding to the values calculated in step (b) (i) and (b) (ii) for the truck to dispense brine and salt from the truck driven over the route.

* * * * *